United States Patent [19]

Morris

[11] Patent Number: 5,730,094
[45] Date of Patent: Mar. 24, 1998

[54] ALTERNATOR FIELD CURRENT CONTROL FOR ACTIVE DRIVELINE DAMPING

[75] Inventor: Robert Leonard Morris, Livonia, Mich.

[73] Assignee: General Motors Corporation, Detroit, Mich.

[21] Appl. No.: 763,581

[22] Filed: Dec. 10, 1996

[51] Int. Cl.[6] .................................................. F02B 75/06
[52] U.S. Cl. ............................................................ 123/192.1
[58] Field of Search ................................ 123/192.1, 192.2

[56] References Cited

U.S. PATENT DOCUMENTS

| | | | |
|---|---|---|---|
| 4,922,869 | 5/1990 | Kadomukai et al. | 123/192.1 |
| 4,982,707 | 1/1991 | Maeda et al. | 123/192.2 |
| 5,056,487 | 10/1991 | Yamakado et al. | 123/436 |
| 5,186,136 | 2/1993 | Kadomukai et al. | 123/192.1 |

FOREIGN PATENT DOCUMENTS

| | | | |
|---|---|---|---|
| 63-204718 | 8/1988 | Japan | 123/192 |
| 1-145718 | 2/1989 | Japan | 123/192 |
| 1-1227765 | 9/1989 | Japan | 123/436 |
| 2226388 | 8/1991 | Japan | 123/192 |

OTHER PUBLICATIONS

Kadomukai, RDducing Vibration invIdling Vehicles by Actively Controlling Electric Machine Torque, JSME Int'l Journal vol. 38, No. 3, Sep. 1995, Series C.

*Primary Examiner*—Noah P. Kamen
*Attorney, Agent, or Firm*—Vincent A. Cichosz

[57] ABSTRACT

Motor vehicle driveline disturbances are attenuated by two sided torque control of an alternator operatively coupled thereto. Available symmetrical torque variation determines the limit of available alternator load torque for attenuation of such driveline disturbances. Requirements for driveline torque variance in excess of that available from the alternator may be met by engine torque variations at combustion events.

12 Claims, 5 Drawing Sheets

ALTERNATOR FIELD CURRENT CONTROL FOR ACTIVE DRIVELINE DAMPING

TECHNICAL FIELD

The present invention relates to low frequency motor vehicle vibration control. More specifically, the invention is directed toward reducing undesirable powertrain torsional vibrations.

BACKGROUND OF THE INVENTION

Vehicle chuggle or fore-aft vehicle oscillations are generally considered to be objectionable to vehicle occupants. Modern automobiles equipped with automatic transmissions are also equipped with fluidic torque converters and torque converter clutches. Greatest efficiency in transmission of engine output torque to the vehicle drive wheels is obtained when the torque converter clutch is fully engaged. Therefore, the application of torque converter clutches is seen to be driven down in vehicle and engine speed in an effort to operate the vehicle with the torque converter clutch in lock-up as much as practical. An unfortunate aspect of full torque converter clutch engagement is that the engine torque perturbations or torsionals normally absorbed by the fluidic coupling of the torque converter are passed directly through the clutch to the remainder of the vehicle drivetrain and vehicle structure and may produce objectionable pulsations and undesirable fore-aft surging known as chuggle. The same objectionable chuggle occurs in analogous fashion with manual transmission drivetrains which of course experience rigid coupling of the engine torque to the drive wheels for even greater overall time and ranges of engine and vehicle speeds.

It has been proposed to operate a torque converter clutch in a continuous, minimally slipping mode to absorb or damp torque perturbations. However, this technique is not applicable to vehicles equipped with manual transmissions and further requires relatively complex torque converter clutch controls, mechanization and materials. Another proposed technique for addressing torque perturbations is set forth in U.S. patent application Ser. No. 08/634,322 also assigned to the Assignee of the present invention, now U.S. Pat. No. 5,669,354. The technique disclosed therein proposes engine output torque compensation through spark retard applied at appropriate cylinder combustion events in appropriate phase to mitigate chuggle conditions. However, when a persistent condition of excitation is encountered, such as when the vehicle is operated substantially steadily at a speed which excites a driveline resonance, the engine efficiency will be significantly reduced by the continued retard of the spark timing. The efficiency reduction may significantly offset any gains in fuel economy realized through the now earlier application of the torque converter clutch without objectionable driveline disturbances. Furthermore, such persistent spark retard may also have deleterious effects upon vehicle emissions. Another technique proposed to address certain undesirable driveline disturbances is disclosed in co-pending U.S. patent application Ser. No. 08/267,320, also assigned to the assignee of the present invention now U.S. Pat. No. 5,573,474. In that application, a time derivative of engine speed is utilized as a control signal to effect torque reductions through spark retard intended to cancel engine RPM deviations. However, the nature of the control disclosed may be such that normal average engine accelerations may cause undesirable torque reductions.

SUMMARY OF THE INVENTION

In accordance with the present invention, a vehicle includes a drivetrain including an internal combustion engine. the drivetrain is operatively coupled to an alternator which introduces a load torque thereon. Undesirable torsional vibrations in a vehicle drivetrain are attenuated by first detecting a vehicle drivetrain rotational speed deviation which so indicates an undesirable torsional vibration. The undesirable torsional vibration is associated with a rotation angle of the engine or portion of the drivetrain. The capability of the alternator is evaluated to determine the extent to which the alternator load torque may be varied. The permissible alternator load torque variance is desirably limited to symmetrical excursions above and below the nominal load torque. The load torque variance is determined in correspondence to the present drivetrain rotation angle and phase adjusted for the actual rotation angle at which the attenuation is to occur. The alternator load torque is then controlled to provide the phase-shifted load torque variance at the actual rotation angle at which the attenuation is to occur. In the event that the load torque variance available from the alternator as determined by the symmetry considerations, the shortfall in desired attenuating torque is phase adjusted for the rotation angle corresponding to the next combustion event and a combustion event parameter is controlled to effectuate the desired shortfall in torque variance.

BRIEF DESCRIPTION OF THE DRAWINGS

The present invention will now be described, by way of example, with reference to the accompanying drawings, in which.

DESCRIPTION OF THE PREFERRED EMBODIMENT

Figure 2:
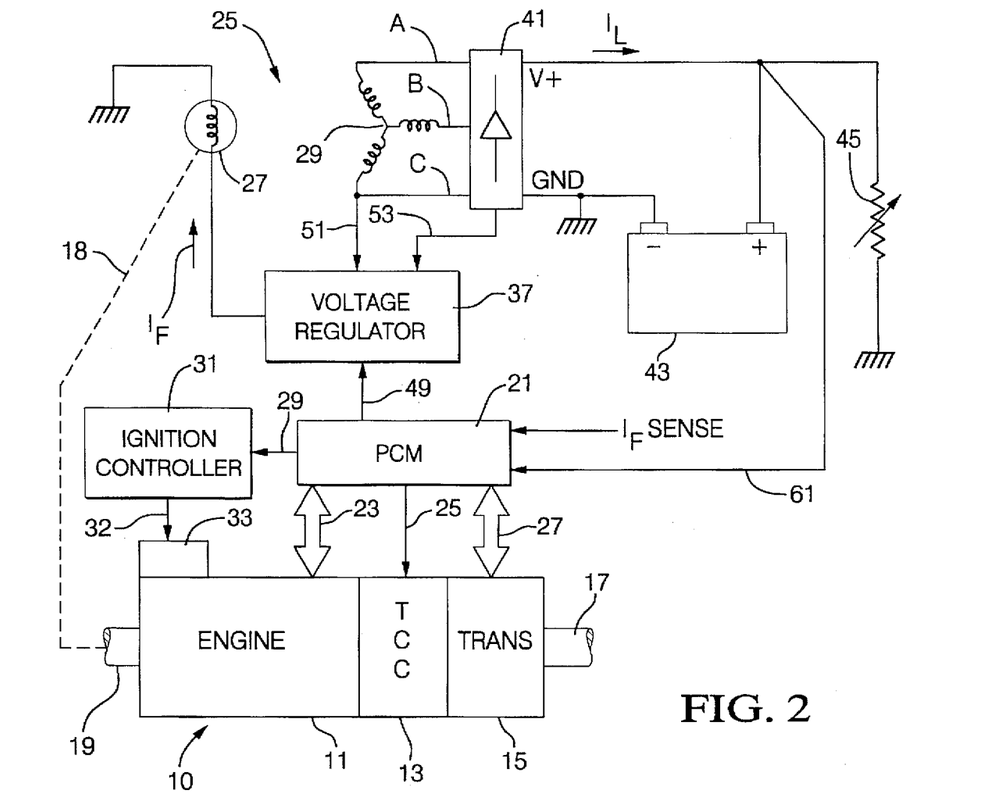
FIG. 2 schematically illustrates a vehicle powertrain system, a vehicle electrical system and computer based controller for implementing the present invention.
Figure 3:
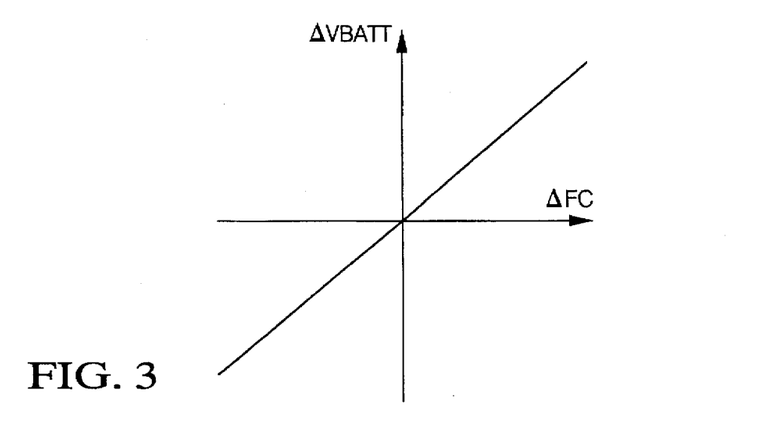
FIG. 3 is a graphical representation of the relationship between desired change in alternator output voltage and change in field excitation current of an alternator in a preferred embodiment of the present invention.

Referring first to FIG. 2, a motor vehicle includes a powertrain generally labeled 10 and more specifically comprising an internal combustion engine 11 coupled to a multi-ratio automatic transmission 15 through an engaged torque converter clutch 13. Torque converter clutch 13 is selectively engageable from a released mode wherein engine 13 output is fluidicly coupled to the transmission 15 input through a torque converter into a lock-up mode wherein engine 13 output is mechanically coupled to the transmission 15 through a clutch mechanism as generally well known to those skilled in the art. Transmission 15 has an output shaft 17 which in turn is mechanically coupled to at least one drive wheel through differential and final drive gear sets (not shown). Engine 11 also has an accessory drive shaft 19 for driving a plurality of engine driven accessories by way of a pulley and belt system (not shown). Such engine powered accessories may include, for example, air conditioning compressors, intake air superchargers and vehicle electrical system alternators.

Engine and transmission control functions are implemented by way of a computer based powertrain control module (PCM) 21 as illustrated in the figure. PCM includes a microprocessor, read only ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. PCM 21 functions to acquire data from a variety of sensors and control a variety of actuators, respectively, of the powertrain system. Therefore, PCM 21 is shown generally in bi-directional interface with engine 11 and transmission 15 via lines 23, and 27. Also shown is TCC actuator line 25 which commands the torque converter clutch engaged or disengaged. Among the various parameters sensed by PCM 21 are transmission oil sump and engine coolant temperatures, engine speed, transmission input or impeller speed and transmission output speed, and throttle position. Among the various actuators controlled by the PCM 21 include fuel injectors, idle air control motor, and transmission oil pressure regulator and shift control solenoids.

In accordance with the present invention, and for reasons made clear at a later point herein, PCM 21 is shown more specifically providing an electronic spark timing (EST) signal output on line 29 to ignition controller 31. Ignition controller 31 responds to EST signal to provide timed output of drive signals to spark plugs 33 for combusting the fuel charge in the cylinders. Furthermore, and as alluded to, accessory drive shaft 19 is operatively coupled as exemplified by the broken line 18 to the vehicle alternator designated generally by the numeral 25. More specifically, the rotor (not shown) of the alternator 25 is belt driven, for example, at an alternator-to-engine speed ratio of 3:1.

In accordance with the exemplary preferred embodiment of the invention, alternator 25 is of the type commonly referred to as a Lundel machine. Structurally, a Lundel machine comprises a rotor shaft and core upon which is wound a field coil 27. Surrounding the field coil and also secured to the shaft for rotation therewith is a pair of opposing claw pole members characterized by interdigitated axially extending fingers. Alternate ones of said fingers thereby provide opposite magnetic poles when the field coil is energized. The rotor as described is surrounded by a stator assembly generally comprised of a plurality of stacked, substantially annular, laminations of steel. A three phase Y-winding 29 is carried by the lamination stack. The rotation of the energized rotor induces a three phase AC output voltage at winding terminals A, B and C. The alternator provides a load torque to the accessory drive shaft and hence to the engine crankshaft in accordance generally with the speed of rotation, field excitation current, and current output from the stator winding.

Stator winding 29 is coupled to a three-phase full wave bridge rectifier 41 which provides a DC output voltage across terminals V+ and GND as illustrated. V+ and GND are coupled to the positive (+) and negative (−) terminals, respectively, of battery 43. Also coupled between V+ and GND are vehicle electrical loads illustrated in the figure as a variable resistance 45. The load current, that is to say the net current delivered from the stator winding to vehicle loads, is labeled $I_L$ in the figure.

Voltage regulator 37 is operative to vary the field current $I_F$ such as through pulse width modulation of system voltage across field coil 27. Field current is desirably determined in practicing the invention as shown by a discrete input $I_F$-sense to PCM 21. $I_F$-sense in the present embodiment may be associated with a current sensor such as conventional current shunt. Alternatively, the field current may be determined from known relationships between the commanded pulse width modulation of system voltage across field coil 27, the voltage regulator 37 providing a signal $I_F$-sense in accordance with the pulse width modulation. Voltage regulator 37 regulates the output voltage of the stator to a set-point voltage sufficient to maintain the battery state of charge and satisfy the active vehicle loads plus a predetermined offset related to a desired change in load torque of the rotor. Preferably, the regulator 37 is a digital regulator utilizing apparatus which responds to the relative magnitudes of an input voltage signal on line 49 and the desired regulated output voltage of the alternator, or the "set-point." Absent torque perturbations of the type addressed by the present invention, the input voltage signal on line 49 is substantially equivalent to the alternator output voltage as measured by the voltage signal on line 61 coupled to the battery positive terminal. The presence of torque perturbations of the type addressed by the present invention influences the voltage signal on line 49 in a manner which varies the alternator output to attenuate the disturbance. The generation of the signal on line 49 will be discussed in further detail at a later point in this disclosure.

Assuming that the torque perturbations are absent, when the actual output voltage of the alternator is below the desired set-point, the regulator energizes the field winding with a semiconductor switch (not shown) that is connected in series with the field winding 27 of the alternator 25. When the actual output voltage of the alternator exceeds the desired set-point the field controlling semiconductor switch is biased off. The semiconductor switch is operated at a predetermined pulse width which is increased when the actual output voltage is below the set-point and decreased when the actual output voltage is above the set-point. Assuming torque perturbations are present, when the actual output voltage of the alternator less a supplied offset voltage is below the desired set-point, the regulator energizes the field winding with a semiconductor switch (not shown) that is connected in series with the field winding 27 of the alternator 25. Furthermore, when the actual output voltage of the alternator plus a supplied offset voltage exceeds the desired set-point the field controlling semiconductor switch is biased off. The offset voltage is such that its introduction in the voltage regulation control is appropriate in magnitude and phase to attenuate the undesirable torque perturbations.

Line 51 provides one phase voltage signal to the voltage regulator for determination of rotation and frequency thereof for use in its determination of rotor speed which may be used to indicate whether the field coil should be energized and if so, to determine an appropriate mode of operation. For example, the field coil is desirably open when the engine is not running and hence the rotor is not rotating. Also, at low rotational speeds, such as those encountered as the vehicle engine is being started, it is desirable to limit the excitation pulse width to a minimal value so as to reduce undesirable additional load torque during engine cranking. The speed information supplied by the one phase voltage signal on line 51 allows the voltage regulator to discern such situations. Additionally, conductor 53 is tied directly to the diode bridge output an provides an input to voltage regulator that is somewhat redundant to the signal on line 49 as follows.

If a voltage signal appears on line 49 in excess of a preset threshold (substantially 4 to 6 volts DC), then selection circuitry in the regulator will use the voltage signal on line 49 in the regulation function. If, however, the voltage threshold is not met, such as may be the case where the voltage signal is lost due to conductor 49 being disconnected or open, the voltage regulator selection circuitry will use the diode bridge output voltage on conductor 53 in the regulation function. A preferred example of a voltage regulator operative as described is commercially available from General Motors Corporation and is described in more detail in U.S. Pat. No. 4,636,706 assigned to the assignee of the present invention.

In accordance with one aspect of the present invention, an amount of desired torque compensation ΔTQ is calculated as a filtered and weighted function of time rate of change of engine speed. The maximum available alternator load torque for attenuating the torque perturbation of the engine above the present load torque is determined. The amount of desired torque compensation up to the torque available at the alternator for attenuation is phase shifted to cancel the phase difference that occurs in the alternator and produce a deviation in alternator load torque to dampen driveline oscillation indicated by the time rate of change in engine speed.

In accordance with another aspect of the present invention, any portion of the desired torque compensation that cannot be satisfied in accordance with the available alternator load torque limitations is phase shifted to cancel the phase difference that occurs in the engine and produce a deviation in engine torque to further dampen driveline oscillation indicated by the time rate of change in engine speed.

Figure 1:
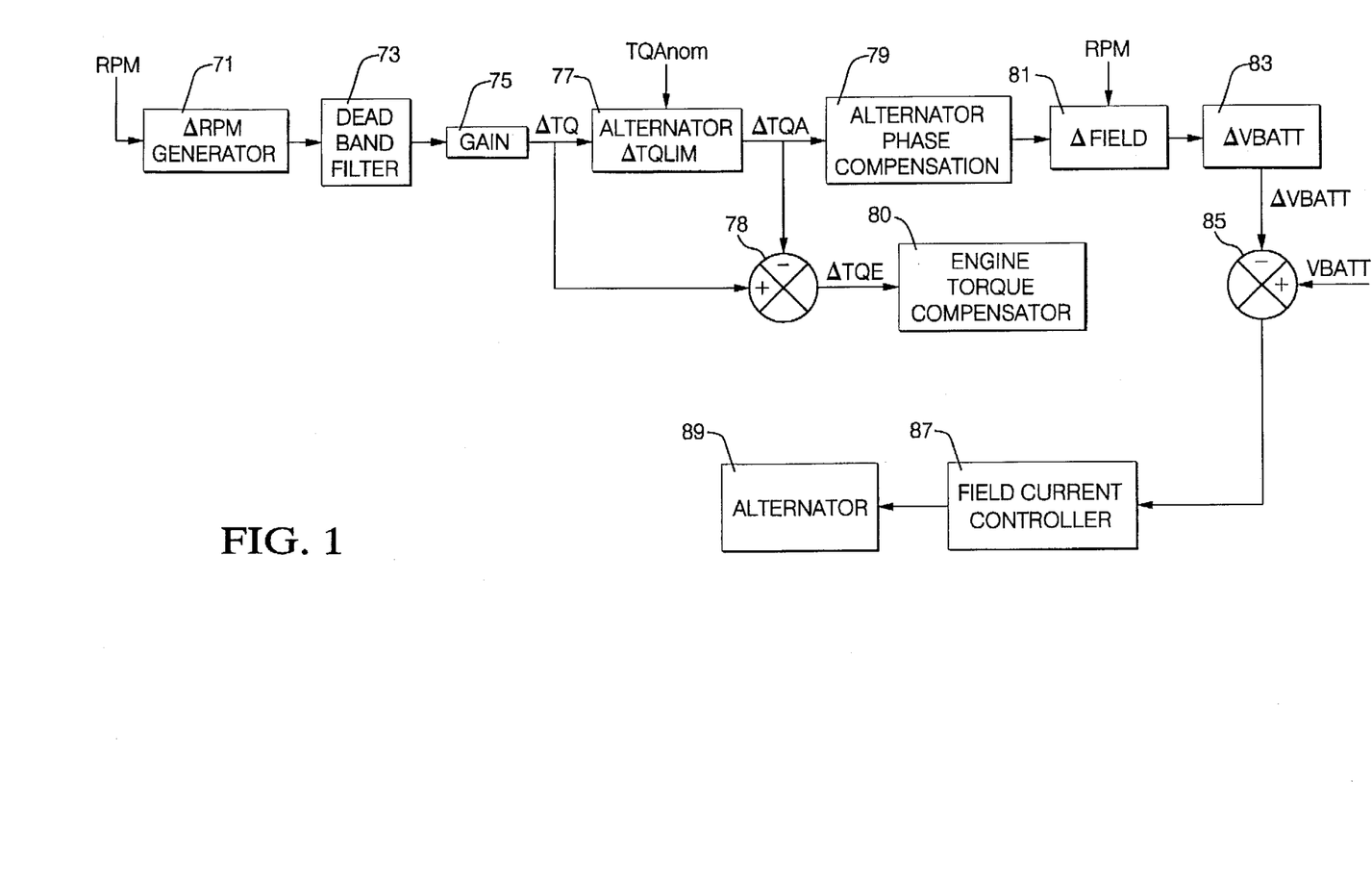
FIG. 1 illustrates a signal flow diagram for a driveline damping control in accord with the present invention.

With reference to the signal flow diagram of FIG. 1, a preferred implementation of the present invention is illustrated. The engine speed RPM is applied to block 71 whereat a speed deviation signal, or time rate of change of RPM signal, is generated. The present embodiment, the engine RPM is preferably referenced to the output speed of the vehicle through individual wheel speed information. Generally, the wheel speed information from right and left wheel speed sensing apparatus provide an average wheel speed which when appropriately scaled in accordance with the total speed ratio operating between the engine and wheels, including the speed ratio of the transmission and the final drive ratio, provides a reference RPM. This reference RPM is subtracted from the measured engine RPM to form the output signal ΔRPM from the ΔRPM signal generator. Alternatively, well known digital filtering techniques may be applied to the measured engine RPM to establish a ΔRPM signal which preferably decays toward zero when the rate of change in engine speed is zero or substantially constant.

The ΔRPM signal is processed by a deadband filter represented by block 73 to provide insensitivity of the remaining blocks to minor RPM deviations including deviations within a range acceptable or imperceptible to the vehicle operator. An acceptable exemplary dead band range is substantially +/−5 rpm.

Block 75 next applies a gain to the ΔRPM signal passed by the deadband filter block 73. The gain K associated with block 75 provides for desirable drive-line dependent tuning. The gain K is selected, for example, from a set of stored values referenced as a function of engine speed and the transmission gear invoked. The gained output of block 75 establishes a desired torque correction amount ΔTQ to dampen the undesirable driveline perturbation.

Figure 4:
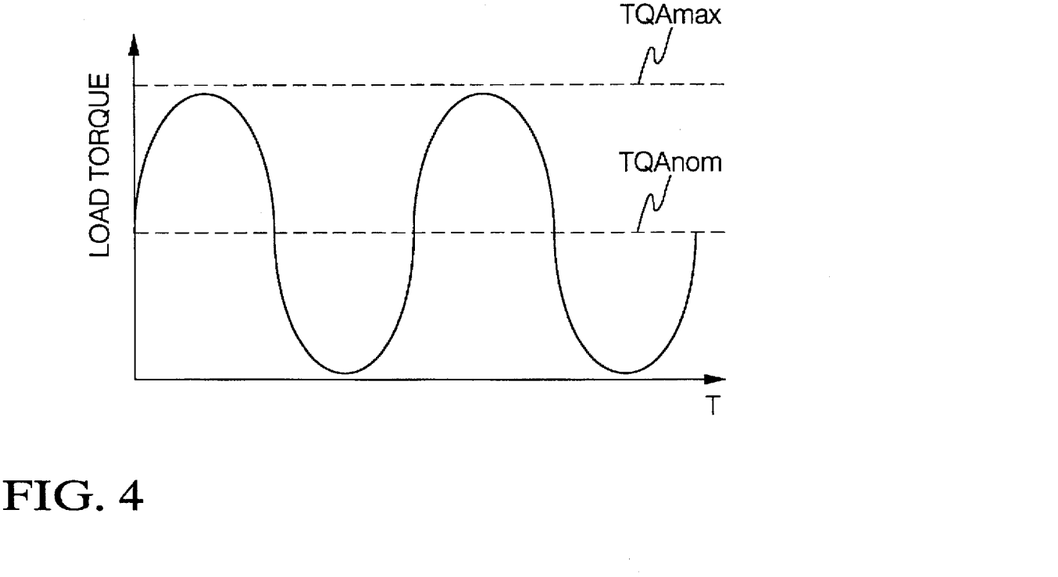
FIG. 4 is a graphical illustration of load current modulation in accordance with a preferred embodiment of the present invention.
Figure 5:
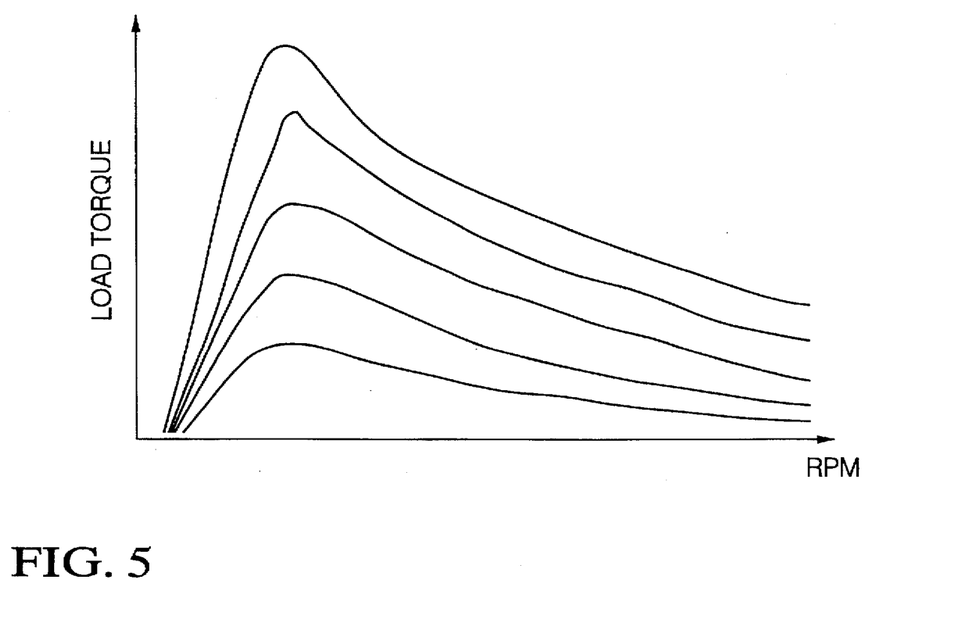
FIG. 5 is a graphical illustration of the general relationship between field excitation current, alternator speed and load torque of an alternator in a preferred embodiment of the present invention; and, FIGS. 6a and 6b are exemplary flow charts illustrating steps for execution by the PCM of FIG. 1 in carrying out the present invention.

The desired torque correction amount ΔTQ is applied to block 77 to determine limitations of the alternator in correcting the torque perturbations in accordance with certain predetermined limiting criteria. Reference may now be made to FIGS. 4 and 5 in addition to FIG. 1 now being considered. First, FIG. 5 is graphically representative of general load torque characteristics of a conventional Lundel type of alternator for certain field current conditions and at a variety of alternator speeds as shown by discrete curves corresponding to decreasing field currents as one moves from the top curve to the bottom curve in the figure. Generally, at a given alternator speed, as field current decreases, so too does alternator torque. However, as can be seen by inspection of the figure, the relationship of output torque to speed is non linear. Nominal alternator load torque TQAnom is shown applied to Alternator ΔTQLIM block 77. In the sense used herein, nominal load torque is defined as the current load torque or desirable load torque prior to any changes invoked by the present invention. The signal output from the Alternator ΔTQLIM block is the available change in alternator torque ΔTQA from the nominal (current) alternator torque condition for correction application to the vehicle driveline in accordance with predefined considerations. In the present embodiment, the considerations for limitations on the change in torque available from the alternator include the desirability of maintaining battery state of charge. Basically, if the desired torque correction ΔTQ can be met by the alternator, the change in alternator torque ΔTQA is set equivalent to the desired torque correction ΔTQ, whereas if the desired torque correction ΔTQ cannot be met by the alternator, the change in alternator torque ΔTQA is set to a limit value.

As indicated, it is desirable to accomplish the damping of the present control such that the battery state of charge is not significantly affected thereby. With this objective in mind, reference is made to FIG. 4 which graphically illustrates a constant nominal alternator load torque as the horizontal broken line labeled TQAnom. The cyclically varying solid line represents a modulated alternator load torque whose time average value is substantially that of the constant nominal alternator load torque TQAnom. The load current delivered by the alternator is substantially proportional to the load torque and therefore the time average value of the load current is such that the net battery current is substantially zero. That is to say, during modulation of the load current above the nominal load current, the battery accepts the excess charge while during modulation of the load current below the nominal load current, the battery provides the charge deficiency to the vehicle loads. The upper broken line in the figure labeled TQAmax represents a maximum load torque which the alternator is capable of producing at present operating conditions. In accord with the mentioned desirability of maintaining battery state of charge, the load torque operating point of the alternator determines the available change in load torque of the alternator for damping vehicle driveline vibrations. Generally, the available change in alternator load torque is determined in accordance with the lesser of the difference between the nominal load torque and the maximum load torque, or the nominal load torque. This allows for symmetrical modulation of alternator load torque about the nominal load torque point allowing the objective of battery state of charge maintenance to be realized.

The change in alternator torque ΔTQA is subtracted from the desired torque correction ΔTQ at summing node 78 to determine the extent of any deficiency in the change in alternator torque. In the case where the desired torque correction ΔTQ can be met by the alternator, the summing node output is substantially zero. However, in the case where the desired torque correction ΔTQ cannot be met by the alternator, the summing node output is the deficiency from the desired torque correction and is labeled ΔTQE.

The change in alternator torque ΔTQA is next applied to alternator phase compensator 79 to cancel the phase difference that occurs in the alternator.

The phase compensated change in alternator torque is next related to a change in the field current corresponding to the alternator torque change at block 81. The change in field current is related then to a change in battery voltage at block 83 to thereby provide a corresponding change in battery voltage signal ΔVBATT. The relations of blocks 81 and 83 are preferably implemented as table look-up functions either literally as illustrated with a two stage look-up process or through a single look-up table process which directly relates the phase compensated change in alternator torque to a change in battery voltage. In either case, the tables are constructed from experimentally derived data sets such as may be obtained through conventional dynamometer bench apparatus.

The change in battery voltage ΔVBATT is then subtracted from the sensed battery voltage VBATT to thereby provide a voltage signal with a torque compensating offset for use by the battery voltage regulation control. In the present embodiment, the voltage regulator control is responsive to a voltage input signal. Absent the inclusion of the control of the present invention, the sensed voltage is equivalent to the battery terminal voltage which is used in determining the propriety of increasing and decreasing the field coil current to regulate the battery voltage to a predetermined set point. However, the present control instead introduces the battery voltage along with the torque compensating offset as the sensed voltage. The voltage regulator is shown as block 87 in FIG. 1 and provides a field current to the alternator 89 in accordance with its predetermined voltage regulation control. The alternator is thereby controlled substantially at a net output current consistent with the objective of maintaining battery state of charge and modulating the alternator output torque to attenuate the undesirable driveline disturbances.

With reference back to the summing node labeled 78, the signal output therefrom, ΔTQE, represents the deficiency from the desired torque correction that the alternator is prohibited from implementing due to, for example, the stated objective of state of charge management described. As such, it may be desirable to implement additional torque compensation through invocation of engine torque compensation such as by spark retard or fuel controls as generally indicated by block 80. Block 80 generally comprises steps for phase compensating the ΔTQE signal to comport with the engine phase characteristics, limiting the torque change from the engine, biasing such changes to effectuate one sided control such as when spark retard is controlled to effectuate output torque changes, and relating the engine torque change signal to a control quantity such as spark retard in the present example. The details of exemplary engine torque compensation may be found in the aforementioned U.S. patent application Ser. No. 08/634,322.

Figure 6A:
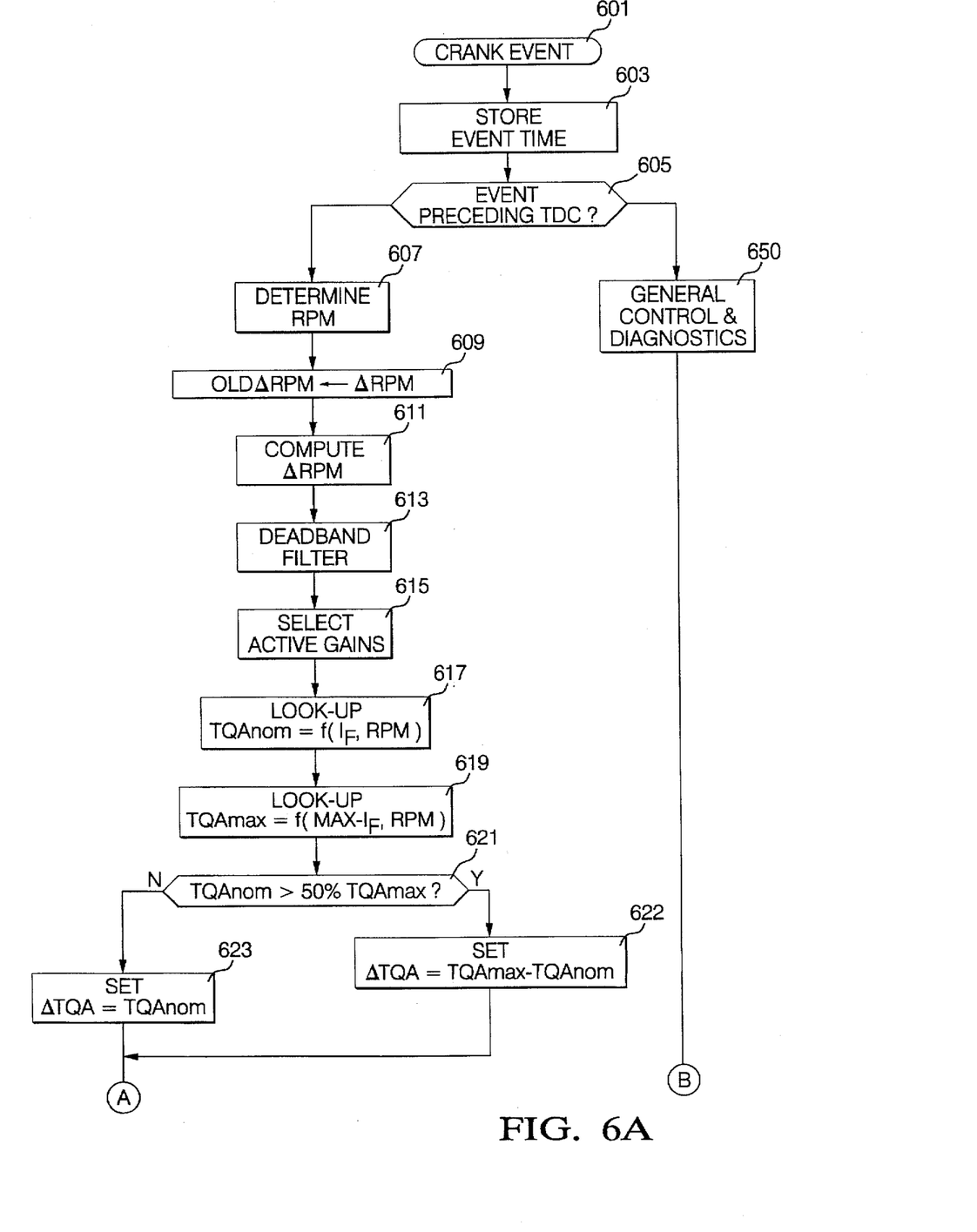
Figure 6B:
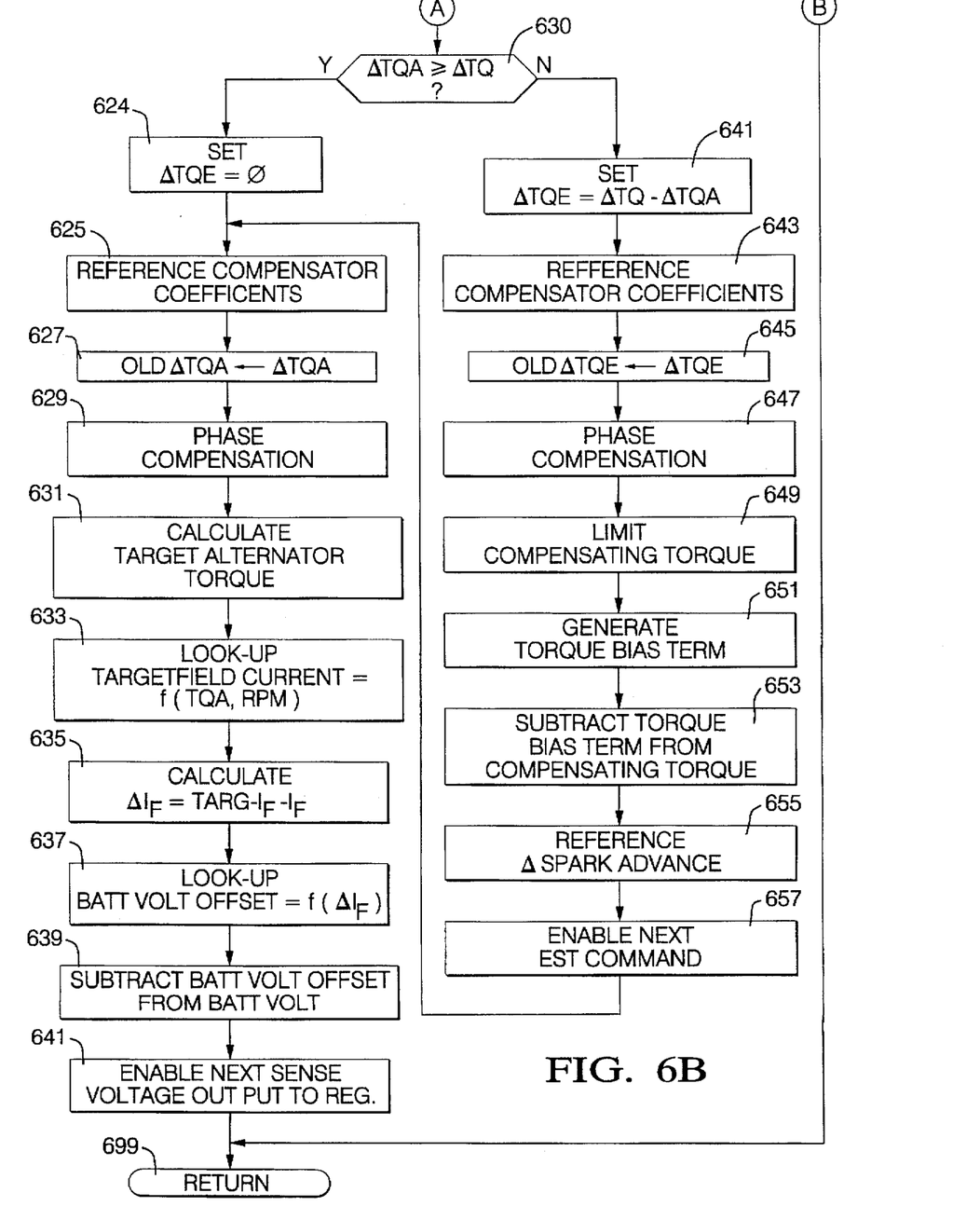

Referring to FIG. 6, a flow diagram representing a set of program instructions for execution by the powertrain control module 21 of FIG. 1 for carrying out the control of the present invention is illustrated. The program steps are preferably implemented in event interrupt fashion from part of a much larger set of program instructions executed in the normal course of controlling various powertrain functions as well known to those having ordinary skill in the art. Preferably, the rotation of the engine crankshaft through equivalent predetermined angles is used to suspend normal execution of program instructions. This is accomplished in accordance with conventional engine crankshaft sensing apparatus such as reference target wheel and variable reluctance sensor. For each such incremental rotation, or crank event, it is determined whether such event precedes a cylinder top dead center position by a predetermined angle. A rotation of the engine through an incremental angle in such a precession relationship to the top dead center position of the cylinder causes the suspension of normal PCM operations and execution of the steps for implementing the present control. The operations of the routine of FIG. 6 are therefore synchronous with engine rotation through regular angular intervals.

Upon precession through each incremental angle as determined by crank events at step 601 at which point the time of the event is stored in random access memory in the PCM at step 603. Step 605 determines whether the crank event precedes the cylinder top dead center position by the predetermined angle. If the event is not so characterized, then the steps corresponding to block 650 are executed to carry out any required conventional engine control and diagnostic functions (e.g. fueling control), after which the interrupt routine is exited as indicated by step 699. Exiting the interrupt routine resumes previously suspended operations by the PCM in servicing the interrupt.

If the event corresponds to the desired angular precession relative to top dead center as determined at block 605, the engine speed RPM is determined at block 607 as an inverse function of the time between the current and most recent prior desired angular precession relative to top dead center. An historically determined value ΔRPM is shifted into a memory location in the PCM as OLDΔRPM at step 609 and the current value ΔRPM is determined and placed in a corresponding register in the PCM to represent the deviation in engine speed from a nominal value. The value ΔRPM is next subjected to a deadband filter operation at step 613 whereat ΔRPM is set to zero if it falls within a predetermined engine speed band around zero to minimize unnecessary compensation. A gain is next determined as a function of engine speed and current active gear ratio at step 615 to provide in vehicle tuning. The gain is determined to correspond to the amount of torque correction for a given engine speed deviation. It is determined through conventional vehicle calibration procedure, for example with a specific powertrain operated on a dynamometer, by starting, for each of a series of engine speeds and active transmission gears, with a minimum gain which is increased until no further compensation improvement is noticed, with the gain for that speed and gear set to the value determined to correspond to the most effective compensation.

Steps 617–623 are next executed to determine the ΔTQA value incorporating limitations on the amount of torque correction available from the alternator. First, step 617 determines the nominal active alternator load torque presented to the engine and drivetrain. Nominal alternator torque ΔTQAnom is selected from a predetermined data set relating field current, alternator speed and alternator torque as graphically depicted and previously described with respect to FIG. 5. The table look-up provides a ΔTQAnom value for later use in determining certain limitations on the alternator torque. Step 619 performs a look-up also from the set of predetermined data relating field current and alternator speed to alternator torque. The predetermined value for maximum field current, essentially in accord with a fully energized field coil at substantially set-point voltage, is combined in the look-up operations with the present RPM to determine the local maximum alternator torque ΔTQAmax. Decision step 621 determines whether the ΔTQAnom value is greater than half of the ΔTQAmax value. If the half point is exceeded, the limiting consideration is the difference between the nominal torque and the maximum torque as shown by step 622, whereas if the half point is not exceeded, then the limiting consideration is the difference between the nominal torque and the minimal torque, or essentially the nominal torque. Such limiting function provides for full two sided implementation of alternator torque control whereby magnitudinally equivalent increases and decreases in alternator torque may be modulated in accordance with the damping requirements of the driveline. Additionally, the torque deviations so modulated retains the desired state-of-charge by maintaining the net battery current at substantially zero as previously described.

Step 630 is next encountered whereat a decision is made as to whether sufficient damping can be accomplished by the amount of available alternator control. If the alternator torque is sufficient, that is to say if the value of change in alternator torque ΔTQA equals or exceeds the desired torque correction ΔTQ, steps 641–657 are bypassed and step 624 is executed to set the amount of engine torque correction to zero. If, however, additional torque is required form the engine in order that the driveline oscillations be adequately damped, blocks 641–657 are executed to set the amount of engine correction torque to the deficiency from the desired torque correction that the alternator is prohibited from implementing. A description of blocks 641–657 follows the description of blocks 625–641.

Assuming the amount of engine torque correction has been established by blocks 641–657 or block 624, coefficients for a phase compensator are next selected at step 625 by referencing for the current engine speed RPM and transmission gear, a set of calibrated gains N0, N1, and D0. These gains are established through a conventional calibration process as required to precisely cancel the phase lag that, in the present embodiment, occurs in the engine.

The current value for change in alternator torque ΔTQA stored in memory is shifted to another location designated OLDΔTQA at step 627, essentially saving the non-phase-compensated value of change in alternator torque ΔTQA. The coefficients are then applied in a conventional phase compensator at step 629 to determine and store in PCM memory a phase compensated change in alternator torque at location ΔTQA. The phase compensator may take the general form:

$$\Delta TQA = D0 * OLD\Delta TQA + N1 * \Delta RPM + N0 * OLD\Delta RPM$$

wherein D0, N0, and N1 are determined at the step 625, OLDΔTQA is a stored most recent prior value of ΔTQA, ΔRPM is the current filtered ΔRPM value and OLDΔRPM is the most recent prior filtered ΔRPM value. The phase compensator cancels the phase difference occurring in the alternator and provides the deviation in alternator torque required to attenuate driveline oscillations in accord with the present invention. The magnitude of engine speed variation is projected by the phase compensator to the precise engine operating angle at which a compensating change in alternator output torque will occur which is, in this embodiment, the next cylinder combustion event, to determine the magnitude of the engine speed variation at that engine operating angle, so that a torque change may be determined for that engine operating angle to accurately oppose or attenuate the engine speed change. Alternative engine operating angles are plausible within the response time limits, or phase lag, of the reactive characteristics of the alternator and the time implementation limits of the PCM. The choice of implementation at the engine operating angle corresponding to the next cylinder combustion event is advantageously chosen to cooperate with complementary torque reduction controls limited to implementation upon combustion events in situations where additional torque reduction in excess of that available from the alternator may be required to fully dampen the undesirable driveline oscillations.

Next, step 631 calculates the target alternator torque as the summation of the nominal alternator torque and the phase compensated change in alternator torque.

$$TQA = TQAnom + \Delta TQA$$

Step 633 performs a table look-up of the target field current TARG-$I_F$ corresponding to the previously determined target alternator torque TQA and alternator RPM. The table may be derived from experimentally determined data relating field current, alternator load torque and alternator RPM. Table data may be constructed from collected data sets relating combinations of established field currents and alternator speeds to measured input torques necessary to maintain rotor speed. The field current $I_F$ is then subtracted from the target field current TARG-$I_F$ current at step 635 to relate the target alternator torque to the change in field current $\Delta I_F$ necessary to achieve the target alternator torque from the nominal alternator torque. At step 637, change in field current is related to a change in battery voltage or a desired battery voltage offset ΔVBATT from the measured battery voltage which when achieved through voltage regulator control effectuates the desired change in alternator torque. The battery voltage offset ΔVBATT is next subtracted from the battery voltage VBATT at step 639 and placed upon a sense voltage output line, line 49 in FIG. 1, in accordance with the previously described update timing related to the crank event timing for use in the voltage regulator control. The voltage regulator will, as described, respond by increasing or decreasing the field current to control the alternator output and hence alternator torque to the desired level. Step 699 next returns control to the main routine from which the interrupt was called.

Referring back to step 630, a deficiency in the alternator torque available for correction causes execution of blocks 641–657. Block 641 is first encountered for setting the engine torque correction ΔTQE to the difference between the amount of torque correction desired and that to be supplied by the alternator. Block 643 next establishes phase compensator coefficients in accordance with engine speed and transmission gear. As is the case with the previously described phase compensation for the alternator torque, the coefficients of the engine phase compensator are established through a conventional calibration process to precisely cancel the phase lag that occurs in the engine. The current value stored in memory and labeled as ΔTQE is next stored as OLDΔTQE at step 645. The coefficients are then applied in a conventional phase compensator as previously described for the alternator torque at step 647 to determine a phase compensated value for ΔTQE.

The determined ΔTQE value is then limited at step 649 to a predetermined torque range determined as sufficient to provide beneficial damping without significantly depleting engine power or having serious deleterious effects upon emissions. A torque bias term is then generated at step 653 to restrict the torque deviation to negative values. The torque bias term is set to ΔTQE if ΔTQE exceeds a most recent prior torque bias value, and otherwise the torque bias value is gradually decayed toward zero along a predetermined decay schedule or with a predetermined time rate of decay. The decay rate should be set up so that the total decay time is approximately the same as the time required to substantially dampen engine speed variations. The generated torque bias term is then subtracted from the ΔTQE value at step 65 and a ΔSPK value representing the ignition timing variation is next determined as a function of the difference as determined at step 655 through application of the difference to a stored look-up table.

The base ignition timing command is then adjusted by the ΔSPK command at step 657 for timed application to a spark plug of the next active engine cylinder. Control then passes to steps 625–641 for determination of the alternator torque control terms as previously described.

While the invention has been described with respect to certain preferred embodiments, it is anticipated that certain improvements and modifications may be apparent to those knowledgeable in the art. Therefore, the embodiments are to be taken by way of non-limiting example of the invention whose scope is to be limited only by the appended claims as appear hereafter.

I claim:

1. A method of controlling torsional vibrations of a vehicle driveline at the output shaft of an internal combustion engine in a vehicle having an electrical system including a storage battery, a voltage regulated alternator, and a voltage regulator responsive to voltage at a battery sense terminal to maintain battery voltage at a predetermined set point, the output shaft coupled to a plurality of combustion cylinders each undergoing a torque producing combustion event in each of repeated engine cycles, said output shag further being operatively coupled to said voltage regulated alternator, comprising the steps:

monitoring engine speed;

detecting an undesirable engine speed variation;

calculating a total desired torque differential suitable for application at the output shaft to substantially counteract said undesirable engine speed variation contemporaneously with said variation;

establishing an alternator torque differential as a portion of said total desired torque differential in accordance with predetermined limits;

establishing a phase-compensated alternator torque differential from said alternator torque differential and a projected rotation angle of the output shaft whereat said phase-compensated alternator torque differential is to be applied;

determining a voltage regulation differential corresponding substantially to the phase-compensated alternator torque differential; and requesting a voltage regulation differential from said voltage regulator to thereby apply said phase-compensated alternator torque differential at the output shaft substantially contemporaneously with the projected rotation angle.

2. The method of controlling torsional vibrations of a vehicle driveline at the output shaft of an internal combustion engine as claimed in claim 1 wherein the step of establishing an alternator torque differential comprises the steps:

determining a current nominal alternator torque;

determining a maximum alternator torque available at current operating conditions; and, limiting the total desired torque differential to the lesser of (a) the difference between the maximum alternator torque and the nominal alternator torque, and (b) the nominal alternator torque.

3. The method of controlling torsional vibrations of a vehicle driveline at the output shaft of an internal combustion engine as claimed in claim 1 wherein the step of establishing a phase-compensated alternator torque differential projects the alternator torque differential from the current rotation angle of the output shaft to the rotation angle of the output shaft corresponding to the alternator phase lag.

4. The method of controlling torsional vibrations of a vehicle driveline at the output shaft of an internal combustion engine as claimed in claim 1 wherein the step of requesting the voltage regulation differential comprises the steps:

biasing sensed battery voltage with said voltage regulation differential; and supplying the biased sensed battery voltage to the voltage regulator battery sense terminal.

5. The method of controlling torsional vibrations of a vehicle driveline at the output shaft of an internal combustion engine as claimed in claim 1 further comprising the steps:

determining an engine torque differential as the difference between said total desired torque differential and said alternator torque differential;

establishing a phase-compensated engine torque differential from said engine torque differential and a projected rotation angle of the output shaft corresponding to the next combustion event whereat said phase-compensated engine torque differential is to be applied; and controlling the torque produced by the next combustion event in accordance with the phase-compensated engine torque differential.

6. The method of controlling torsional vibrations of a vehicle driveline at the output shaft of an internal combustion engine as claimed in claim 2 wherein the step of controlling the torque produced by the next combustion event comprises the steps:

generating a change in timing of the next cylinder combustion event that will substantially provide for the phase-compensated engine torque differential; and, varying the time of ignition of the next cylinder combustion event by the generated change in timing.

7. A method of controlling torsional vibrations of a vehicle driveline at the output shaft of an internal combustion engine in a vehicle having an electrical system including a storage battery, a voltage regulated alternator, and a voltage regulator responsive to voltage at a battery sense terminal to maintain battery voltage at a predetermined set point, the output shaft coupled to a plurality of combustion cylinders each undergoing a torque producing combustion event in each of repeated engine cycles, said output shaft further being operatively coupled to said voltage regulated alternator, comprising the steps:

monitoring engine speed;

detecting an undesirable engine speed variation;

calculating a total desired torque differential suitable for application at the output shaft to substantially counteract said undesirable engine speed variation contemporaneously with said variation;

establishing an alternator torque differential as a portion of said total desired torque differential in accordance with predetermined limits;

establishing a phase-compensated alternator torque differential from said alternator torque differential and a projected rotation angle of the output shaft corresponding to the next cylinder combustion event whereat said phase-compensated alternator torque differential is to be applied;

determining an engine torque differential as the difference between said total desired torque differential and said alternator torque differential;

establishing a phase-compensated engine torque differential from said engine torque differential and a projected rotation angle of the output shaft corresponding to the next combustion event whereat said phase-compensated engine torque differential is to be applied;

controlling the torque produced by the alternator at the next combustion event in accordance with the phase-compensated alternator torque differential; and, controlling the torque produced by the next combustion event in accordance with the phase-compensated engine torque differential.

8. The method of controlling torsional vibrations of a vehicle driveline at the output shaft of an internal combustion engine as claimed in claim 7 further comprising the steps:

determining a current nominal alternator torque;

determining a maximum alternator torque available at current operating conditions; and, wherein the predetermined limits comprise the lesser of (a) the difference between the maximum alternator torque and the nominal alternator torque, and (b) the nominal alternator torque.

9. The method of controlling torsional vibrations of a vehicle driveline at the output shaft of an internal combustion engine as claimed in claim 7 wherein the step of controlling the torque produced by the alternator at the next combustion event comprises the steps:

determining a voltage regulation differential corresponding substantially to the phase-compensated alternator torque differential; and requesting a voltage regulation differential from said voltage regulator to thereby apply said phase-compensated alternator torque differential at the output shaft substantially contemporaneously with the next combustion event.

10. A method for attenuating undesirable torsional vibrations in a vehicle drivetrain including an internal combustion engine, the drivetrain being operatively coupled to an alternator, the alternator providing a nominal load torque to the drivetrain comprising the steps:

detecting a vehicle drivetrain rotational speed deviation indicative of undesirable torsional vibration at a first vehicle drivetrain rotation angle;

determining the capability of the alternator to vary load torque symmetrically about the nominal load torque;

determining a load torque variance which would substantially attenuate the undesirable vehicle drivetrain rotational speed deviation at the first vehicle drivetrain rotation angle;

limiting the determined load torque variance by the determined capability of the alternator;

phase shifting the limited determined load torque variance to correspond to a second vehicle drivetrain rotation angle whereat attenuation of the undesirable vehicle drivetrain rotational speed deviation is to occur to thereby provide a phase-shifted load torque variance to attenuate the undesirable vehicle drivetrain rotational speed deviation occurring at the second vehicle drivetrain rotation angle; and controlling the alternator load torque to provide the phase-shifted load torque variance at the second vehicle drivetrain rotation angle.

11. A method for attenuating undesirable torsional vibrations as claimed in claim 10 wherein when the determined capability of the alternator is less than the determined load torque variance:

determining an engine torque variance as the difference between the limited determined load torque variance and the determined load torque variance;

phase shifting the engine torque variance to correspond to a third vehicle drivetrain rotation angle whereat a combustion event occurs, to thereby provide a phase-shifted engine torque variance to attenuate the undesirable vehicle drivetrain rotational speed deviation occurring at the third vehicle drivetrain rotation angle; and controlling the torque produced by the combustion event in accordance with the phase-shifted engine torque variance.

12. A method for attenuating undesirable torsional vibrations as claimed in claim 11 wherein the second and third vehicle drivetrain rotation angles are equivalent and correspond to the next combustion event.

* * * * *